July 21, 1931.　　D. E. JOHNSON ET AL　　1,815,375

DEVICE FOR TESTING VACUUM TUBES

Filed Nov. 21, 1929

INVENTORS.
DAVID E. JOHNSON.
PAUL F. JACKSON.

ATTORNEY.

Patented July 21, 1931

1,815,375

UNITED STATES PATENT OFFICE

DAVID E. JOHNSON AND PAUL F. JACKSON, OF DAYTON, OHIO

DEVICE FOR TESTING VACUUM TUBES

Application filed November 21, 1929. Serial No. 408,903.

This invention relates to a device for testing vacuum tubes, such as the audion tubes commonly used in radio receiving sets. Tube testers or checkers as commonly constructed employ a milliammeter to indicate the value or amount of current in the plate circuit of the tube under test. Milliammeters are of delicate construction and are expensive to manufacture and therefore add greatly to the cost of the tube tester. Further, a milliammeter will not definitely indicate all conditions within the tube under test, such as a short circuit between certain elements within the tube. In such tube testers it is customary to provide a rheostat to enable the alternating current supplied to the tube under test to be regulated in accordance with the characteristics of the tube and thus enable tubes having different characteristics to be tested on the same apparatus.

One object of the invention is to provide a tube testing device with a simple inexpensive indicating device which will definitely indicate the condition of the tube, that is, whether or not the plate current is sufficient to enable the tube to perform the service for which it is designed.

A further object of the invention is to provide such an indicating device which will definitely indicate the existence of a short circuit between certain elements within the tube.

A further object of the invention is to provide a tube testing device of such a character that tubes of different kinds or having different characteristics may be tested thereon without the necessity of manually regulating the voltage supplied to the tube under test.

Other objects of the invention will appear as the apparatus is described in detail.

Figure 1:
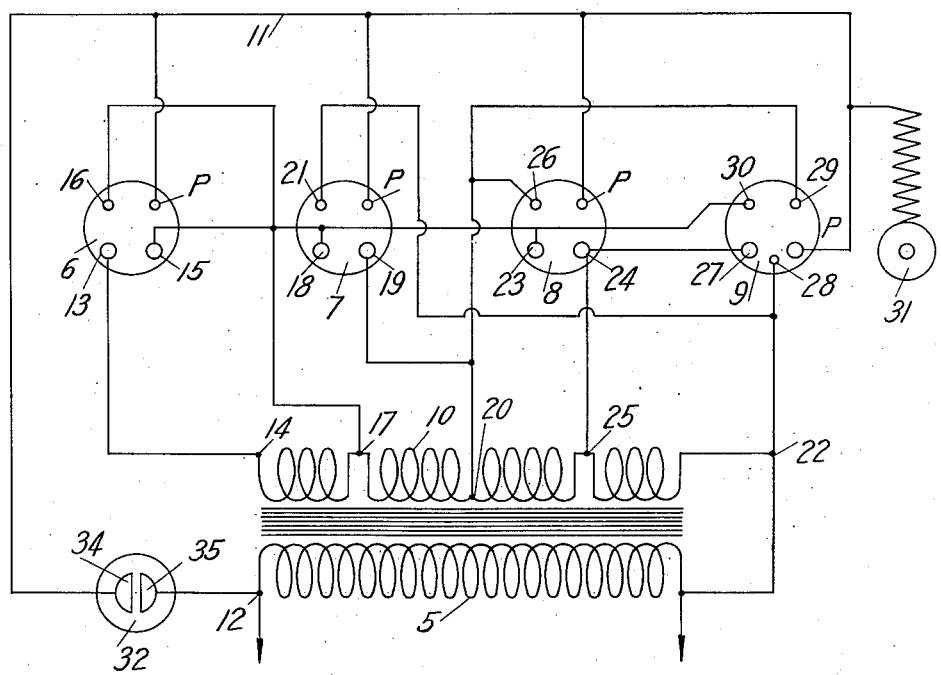
Figure 2:
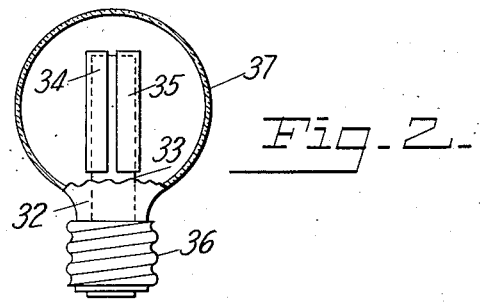

In the accompanying drawings Fig. 1 is a circuit diagram of a tube tester embodying our invention; and Fig. 2 is a detail view, partially in section, of a glow lamp.

In these drawings we have illustrated one embodiment of our invention and have shown the same as embodied in a tube checker the main features of which are well known. It will be understood, however, that the invention may be applied to tube checkers of various kinds.

The tube tester here illustrated is similar in its broad features of construction and operation to the tube testing device shown in the patent to Goodwin No. 1,704,566 of March 5, 1929, and it will therefore be unnecessary to describe in detail the construction and operation thereof. The tube tester comprises a transformer, or primary coil, 5 which is adapted to be connected across an alternating current source, as by plugging it in on an ordinary lighting circuit. The tester is provided with one or more tube receiving sockets and, as here illustrated, it has four such sockets, as shown at 6, 7, 8 and 9, and each socket is adapted to receive a tube having certain definite characteristics, the characteristics of each tube being different from those of the other tubes. Each tube receiving socket has its filament and grid terminals connected with the secondary coil 10 of the transformer and the several tube sockets have their plate terminals P connected with a single plate circuit 11 which is connected with the alternating current source, as shown at 12. The connections between the filament and grid terminals of the several sockets and the secondary are such that different voltage will be impressed upon the filament and grids of tubes in the several sockets, it being understood, of course, that the tubes are tested individually and that when the apparatus is in use one socket only will contain a tube. The tube socket 6 has its filament terminal 13 connected with the secondary at 14 and has the second filament terminal 15 and the grid terminal 16 connected with the secondary at 17, the arrangement being such as to cause a certain definite voltage, for example, one and one-half volts, to be impressed upon the filament and grid of a tube in that socket. The socket 7 has its filament terminal 18 connected with the secondary at 17 and has its second filament terminal 19 connected with the secondary at 20. The grid terminal 21 is connected with the secondary at 22. The third socket 8 also has its filament terminal 23 connected with the secondary at 20 and has its filament terminal 24 connected with the secondary at 25. The grid terminal 26 is connected with the secondary at 20. The fourth socket 9 has five terminals, the filament terminal 27 being connected with the secondary at 25, the filament terminal 28 being connected with the secondary at 22, the grid terminal 29 being connected with the secondary at 20 and the cathode terminal 30 being connected with the secondary at 17. The plate circuit 11 is also connected with an inner grid terminal 31.

The connections between the several sockets and the secondary are such that the alternating current voltage impressed upon a tube in any one of the sockets will be such as to cause the plate current produced in that tube to be similar in value to the plate current which would be produced in a tube in any of the other sockets, thereby enabling tubes of different characteristics to be tested on the one appartus by inserting the respective tubes in the sockets designed therefor.

An indicating device is interposed in the plate circuit 11, as shown at 32, to indicate the value or amount of current in that circuit. Preferably this indicating device comprises a glow lamp, such as a neon tube. The glow lamp, as shown in Fig. 2, comprises a vacuum tube 37 having mounted therein a core 33 of insulating material. Supported on this core are two electrodes 34 and 35 which are insulated one from the other. These electrodes are, in the present instance, slightly less than semi-circular in cross section so that they fit about and are supported by the core but the adjacent edges of the two electrodes are spaced one from the other. The electrodes are electrically connected respectively with the base and side walls of the plug 36 of the tube and when the lamp is inserted in the plate circuit of the tube tester the electrodes will be connected with the respective sides of that circuit. When a pulsating direct current of a predetermined value is created in the plate circuit by the tube under test the polarity of the electrodes of the glow lamp will be unchanging and the direction of the electronic flow within the lamp will not reverse but will be steady between the charged electrodes. As a result one electrode only will be illuminated, this electrode being surrounded by a glow or fluorescence while the other electrode is free from any glow or fluorescence. If the current created in the plate circuit by the tube is of a value less than the predetermined value neither electrode will be illuminated and the lamp will not glow or emit any considerable amount of light. Should some of the elements within the tube under test be short circuited so as to produce an alternating current in the plate circuit the polarity of the electrodes of the glow lamp will be reversed at the same frequency as that imposed upon the filament of the tube under test and due to this alternating current both electrodes of the lamp will be illuminated or surrounded by flourescence while the space between the two electrodes will not be illuminated but will be clearly visible. As a result the glow lamp will indicate at a glance the condition of the tube. If the tube emits a plate current which will enable it to function properly for the purpose for which it is intended a single electrode of the lamp will be illuminated. If the plate current emitted by the tube is insufficient to enable it to function properly for its intended purpose neither electrode will be illuminated. If a short circuit exists between certain elements within the tube then both electrodes will be illuminated.

When the glow lamp is used, as above described, it is desirable that the several plate currents should not differ greatly in value but when the indicating device is of another type, such as a milliammeter, there may be a greater difference in the values of the plate currents so long as they are of such similarity that they may all be indicated on the one indicating device.

It will be apparent, therefore, that we have provided an indicating device for a tube tester which is positive in its operation, very easily read to determine the indication, and is inexpensive to produce and, further, we have provided a tube tester on which tubes having different characteristics can be tested without adjusting the apparatus or regulating the voltage of the alternating current supplied to the tube.

While we have shown and described one embodiment of our invention we wish it to be understood that we do not desire to be limited to the details thereof as various modifications may occur to a person skilled in the art.

Having now fully described our invention, what we claim as new and desire to secure by Letters Patent, is:

1. A tube testing device comprising a transformer having means for connecting the primary thereof across an alternating current source, a plurality of tube sockets adapted to receive vacuum tubes having different characteristics, the several sockets having their filament and grid terminals so connected with the secondary of said transformer that the current supplied to tubes in the several sockets will create in the tube plate circuits currents of similar values, a plate circuit connecting the plate terminals of the several tube sockets with said alternating current source, and a current indicating device in said plate circuit.

2. A tube testing device comprising a transformer having means for connecting the primary thereof across an alternating current source, a plurality of tube sockets adapted to receive vacuum tubes having different characteristics, the several sockets having their filament and grid terminals so connected with the secondary of said transformer that the current supplied to tubes in the several sockets will create in the tube plate circuits currents of similar values, a plate circuit connecting the plate terminals of the several tube sockets with said alternating current source, and a glow lamp in said plate circuit to indicate whether the plate current is above or below a predetermined value.

3. A tube testing device comprising a transformer having means for connecting the primary thereof across an alternating current source, a plurality of tube sockets adapted to receive vacuum tubes having different characteristics, the several sockets having their filament terminals so connected with the secondary of said transformer that each socket will receive from said secondary a filament voltage of predetermined value and the filament voltage of each socket will differ from the filament voltage of the other sockets, said tube sockets also having their grid terminals connected with said secondary, a plate circuit connecting the plate terminals of the several tube sockets with said alternating current source, and a current indicating device in said plate circuit.

In testimony whereof, we affix our signatures hereto.

DAVID E. JOHNSON.
PAUL F. JACKSON.